No. 871,339. PATENTED NOV. 19, 1907.
F. F. HORN.
HAND RAKE ATTACHMENT.
APPLICATION FILED MAR. 7, 1907.

Frederick F. Horn,
INVENTOR.

WITNESSES:

By C. A. Snow & Co.
ATTORNEYS

UNITED STATES PATENT OFFICE.

FREDERICK FRANCIS HORN, OF COLORADO SPRINGS, COLORADO.

HAND-RAKE ATTACHMENT.

No. 871,339.

Specification of Letters Patent.

Patented Nov. 19, 1907.

Application filed March 7, 1907. Serial No. 361,137.

*To all whom it may concern:*

Be it known that I, FREDERICK FRANCIS HORN, a citizen of the United States, residing at Colorado Springs, in the county of El Paso and State of Colorado, have invented a new and useful Hand-Rake Attachment, of which the following is a specification.

My present invention relates to an improvement in hand rakes, and it has for its object to provide a device of this character that may be manipulated with the greatest facility without the necessity of lifting it from the ground on the return strokes, and which is particularly efficient when used on lawns, as the prongs cannot become entangled in the roots of the grass, the device also being adapted for use as a scraping and leveling implement.

To these and other ends, the invention consists in certain improvements and combinations and arrangements of parts, all as will be hereinafter more fully described, the novel features being pointed out in the claims at the end of the specification.

Figure 2:
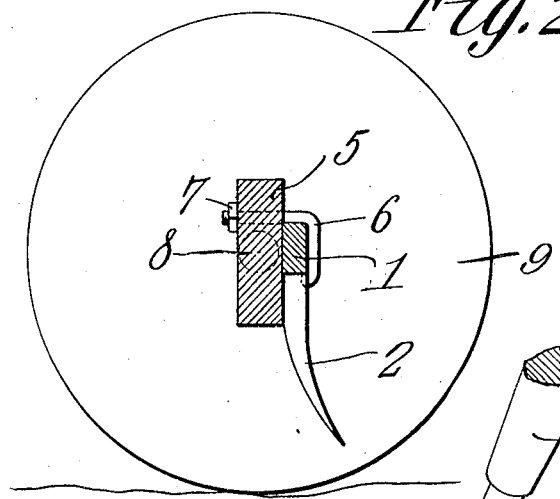
Figure 1:
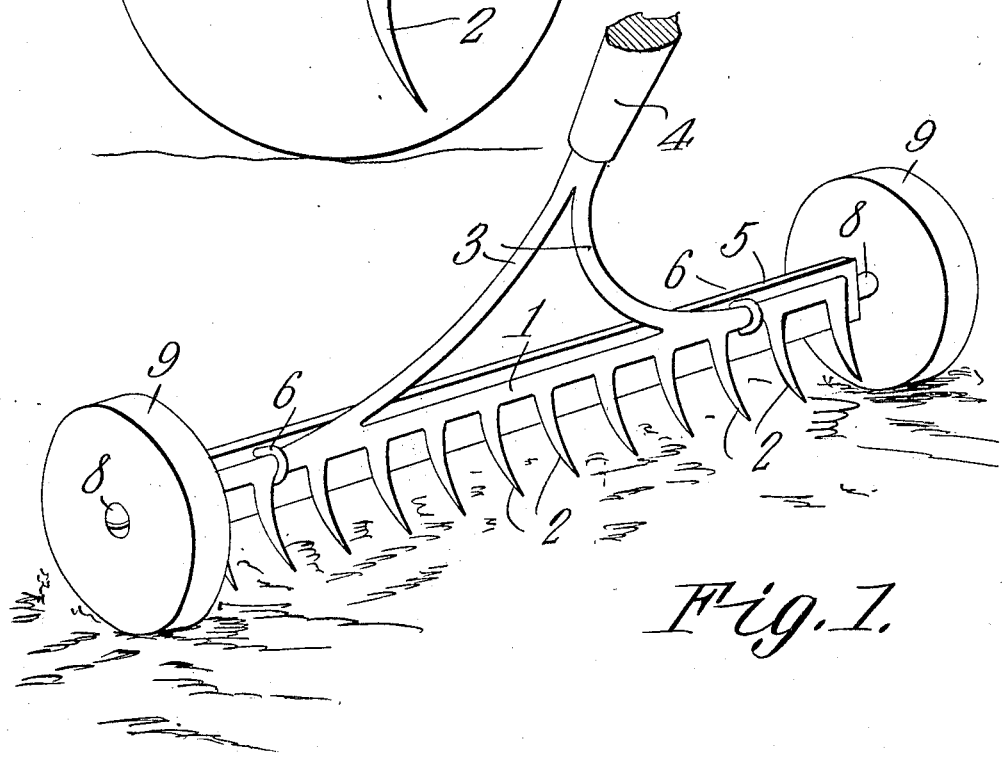

In the accompanying drawing, Figure 1 is a perspective view of a hand rake constructed in accordance with my present invention. Fig. 2 represents a transverse section thereof.

Similar parts in the several figures are designated by the same characters of reference.

In the present embodiment of my invention, a rake of the usual construction is employed in connection with supporting devices which serve to facilitate the movement of the rake over the ground and act as gages to support the rake prongs at the desired height relatively to the ground, and these supporting devices in turn coöperate with a scraping and leveling bar, the latter, in the present instance, serving as means of attachment for the rake.

The rake employed in the present instance embodies the usual cross piece 1 having a set of downwardly directed prongs 2 extending from its lower side. The prongs are preferably curved forwardly, as shown in Fig. 2, and to this cross piece are connected the bracket arms 3 to which the usual handle 4 is rigidly secured. The cross piece of the rake is secured to the forward surface of a vertically arranged plate 5, threaded yokes 6 straddling the cross piece and extending through the plate and serving to provide means for readily attaching the rake to its attachment, nuts 7 being preferably employed in order that a new rake may be substituted in case of breakage. The ends of the plate 5 are provided with a pair of axially extending journals 8 having wheels or rollers 9 journaled thereon, the latter serving to support the rake and the plate to which it is attached as the parts are moved over the ground the prongs of the rake being supported at a given elevation relatively to the surface of the ground so that they cannot catch certain articles as the roots of grass, and they also serve as a gage for the edge or edges of the plate 5 when the latter is used as a scraping or leveling tool. As the lower ends of the prongs are offset forwardly of the pivotal center of the plate 5, variations in the angular relation of the rake handle to the ground will serve to adjust the height of the prongs relatively thereto, so that the best results may be obtained without the necessity of readjusting the parts.

The present invention provides a hand rake that may be manipuated with the greatest facility in raking lawns which requires the exercise of care to avoid destroying the roots of the grass, and the operation may be accomplished expeditiously, as the rake operates on both the forward and rearward stroke, and, furthermore, the implement is well adapted for use on rough or uncovered ground, as the horizontally extending plate behind the rake may be employed as a scraper or leveler, the supporting wheels serving to guide it. A device of this kind may be constructed very cheaply as it is adapted to receive rakes of the ordinary form and, in the present instance, the device is adapted to receive rakes interchangeably so that in the case of breakage the rake portion may be easily replaced.

What is claimed is:—

1. An attachment for hand rakes embodying a flat plate having journals projecting longitudinally from its opposite ends, rollers mounted to turn on said journals, and devices for securing the rake in coöperative relation with one of the flat sides of the plate and having its prongs projecting downwardly beyond one of its longitudinal edges.

2. The combination with a scraper embodying a horizontal plate, and supporting devices thereon arranged to coöperate with the ground, of a rake having a cross piece provided with prongs extending downwardly below one of the scraping surfaces of said plate, and devices coöperating with said cross piece for securing the latter in coöperative relation with said scraper.

3. The combination with a supporting member, having journals formed at its ends, and rollers mounted on said journals, of a rake embodying a cross piece having depending prongs thereon, and staples coöperating with said cross piece for securing the latter in coöperative relation with said supporting member.

4. The combination with a plate, and supporting rollers journaled on its ends, of a rake having prongs projecting downwardly beyond one edge of said plate, means for securing said rake in coöperative relation with said plate, and a scraping surface formed on the plate opposite to the rake prongs and extending parallel to the axis of the rollers.

5. The combination with a plate having an edge adapted to serve as a scraper and provided with journals extending longitudinally from opposite ends thereof, and supporting rollers mounted on said journals, of a rake embodying a cross piece having prongs extending downwardly therefrom below the lower edge of said plate, and staples straddling said cross piece and extending through said plate for securing the rake in coöperative relation with the forward surface thereof.

In testimony that I claim the foregoing as my own, I have hereto affixed my signature in the presence of two witnesses.

FREDERICK FRANCIS HORN.

Witnesses:
  FRANK J. WATERS,
  F. R. SMITH.